US011644240B2

(12) United States Patent
Ebner et al.

(10) Patent No.: US 11,644,240 B2
(45) Date of Patent: *May 9, 2023

(54) TEMPERATURE-CONTROL UNIT FOR A FURNACE DEVICE FOR HEAT TREATING A PLATE

(71) Applicant: EBNER INDUSTRIEOFENBAU GMBH, Leonding (AT)

(72) Inventors: Robert Ebner, Leonding (AT); Andreas Sauschlager, Leonding (AT); Anton Oppermann, Steyr (AT); Daniel Schatz, Asten (AT); Günter Kirschner, Traun (AT); Lukas Heitzmann, Traun (AT); Harald Humer, Linz (AT); Mustafa Music, Pasching (AT)

(73) Assignee: Ebner Industrieofenbau GmbH, Leonding (AT)

( * ) Notice: Subject to any disclaimer, the term of this patent is extended or adjusted under 35 U.S.C. 154(b) by 364 days.

This patent is subject to a terminal disclaimer.

(21) Appl. No.: 16/767,101

(22) PCT Filed: Nov. 29, 2018

(86) PCT No.: PCT/EP2018/082994
§ 371 (c)(1),
(2) Date: May 26, 2020

(87) PCT Pub. No.: WO2019/106083
PCT Pub. Date: Jun. 6, 2019

(65) Prior Publication Data
US 2020/0370833 A1 Nov. 26, 2020

(30) Foreign Application Priority Data
Dec. 1, 2017 (DE) .................. 10 2017 128 574.1

(51) Int. Cl.
*F27D 9/00* (2006.01)
*C21D 9/00* (2006.01)
(Continued)

(52) U.S. Cl.
CPC ............. *F27D 9/00* (2013.01); *C21D 9/0062* (2013.01); *C21D 9/46* (2013.01); *C21D 11/005* (2013.01);
(Continued)

(58) Field of Classification Search
CPC .. F27D 9/00; C21D 1/00; C21D 11/00; C21D 11/005; C21D 8/02; C21D 8/0294;
(Continued)

(56) References Cited

U.S. PATENT DOCUMENTS 2,332,368 A * 10/1943 Burtenshaw ........... B21D 53/08
228/222
3,382,342 A * 5/1968 Dix .................... H01L 21/67126
174/17.05
(Continued)

FOREIGN PATENT DOCUMENTS

CN 104087725 A 10/2014
DE 10 2012 216 468 B3 1/2014
(Continued)

OTHER PUBLICATIONS

International Search Report of corresponding PCT/EP2018/082994 with English translation, dated Jan. 18, 2019, 7 pages.
(Continued)

*Primary Examiner* — Scott R Kastler
*Assistant Examiner* — Michael Aboagye
(74) *Attorney, Agent, or Firm* — Lewis Roca Rothgerber Christie LLP (57) ABSTRACT

The present invention relates to a temperature-control unit for a furnace device for heat treating a plate, in particular a
(Continued)

metal plate. The temperature-control unit has a temperature-control body, which is arrangeable in a furnace chamber of the furnace device. The temperature-control body has a plurality of receiving bores. Furthermore, the temperature-control unit has a plurality of temperature-control pins, wherein the temperature-control pins are mounted in the receiving bores movably relative to the temperature-control body. The temperature-control pins are controllable in such a way that a temperature-control group of the temperature-control pins is extendable from the temperature-control body in the direction towards the plate, so that a thermal contact between the temperature-control group of the temperature-control pins and a predetermined temperature-control zone of the plate is generatable.

19 Claims, 3 Drawing Sheets (51) Int. Cl.
*C21D 9/46* (2006.01)
*C21D 11/00* (2006.01)
*B33Y 80/00* (2015.01)

(52) U.S. Cl.
CPC ............ *B33Y 80/00* (2014.12); *C21D 2211/00* (2013.01); *F27D 2009/0081* (2013.01)

(58) Field of Classification Search
CPC .......... C21D 8/0494; C21D 9/00; C21D 9/46; C21D 9/0062; C21D 9/0056
USPC ...... 266/260, 249, 252, 258; 219/243, 85.16
See application file for complete search history.

(56) References Cited

U.S. PATENT DOCUMENTS

| 3,478,192 | A | * | 11/1969 | Fink ..................... B30B 15/064 165/104.31 |
| 5,158,132 | A | * | 10/1992 | Guillemot ............... B29C 33/04 219/448.11 |
| 5,435,378 | A | * | 7/1995 | Heine ................... B23K 3/047 228/180.1 |
| 11,131,001 | B2 | * | 9/2021 | Eckertsberger ..... F27D 99/0001 |
| 2018/0231311 | A1 | | 8/2018 | Wilden et al. |
| 2018/0237871 | A1 | | 8/2018 | Eckertsberger et al. |

FOREIGN PATENT DOCUMENTS

| DE | 10 2015 113 407 A1 | 2/2017 |
| DE | 10 2015 215 179 A1 | 2/2017 |
| EP | 2 336 374 A1 | 6/2011 |
| JP | 2018528380 A | 9/2018 |
| WO | 2017025632 A1 | 2/2017 |

OTHER PUBLICATIONS

International Written Opinion of corresponding PCT/EP2018/082994, dated Jan. 18, 2019, 8 pages.

* cited by examiner

TEMPERATURE-CONTROL UNIT FOR A FURNACE DEVICE FOR HEAT TREATING A PLATE

REFERENCE TO RELATED APPLICATIONS

The present application is a national phase application derived from the international patent application no. PCT/EP2018/082994, filed Nov. 29, 2018, which in turn claims the benefits of the filing dates of the German patent application no. DE 10 2017 128 574.1, filed Dec. 1, 2017, all of which are incorporated herein by reference in their entireties.

TECHNICAL FIELD

The present invention relates to a temperature-control unit for a furnace device for heat treating a plate. Furthermore, the present invention relates to a temperature-control system having at least two temperature-control units, and to a method for operating a temperature-control unit.

BACKGROUND OF THE INVENTION

In the manufacture of metal components, ever higher demands are placed on the exact adjustability of individual (micro)structure areas and corresponding areas having a desired strength. For example, in car body construction for motor vehicles, preference is given to components, which have a light weight while at the same time have a desired strength and a desired deformation behaviour. In areas of the car body, which may be subjected to particularly high loads in the event of a crash, press-hardened components are used, which are made of high-strength steels and have different ductile areas. As examples of such components, the A- and B-pillar, the bumper bar and door impact beams of a motor vehicle may be mentioned.

Components having different ductile areas are produced, for example, by metal plates having areas, which are heat treated differently. This different heat treatment of different areas of the metal plates is controlled, for example, by a targeted setting of different temperature and/or cooling profiles.

Presentation of the Invention

There may be a need to provide a device for the exact adjustment of structural areas of a (printed) plate.

This need may be satisfied by a temperature-control unit for a furnace device for heat treating a plate, a temperature-control system as well as a method for operating a temperature-control unit according to the independent patent claims.

According to a first aspect of the present invention, a temperature-control unit for a furnace device for heat treating a plate (or blank, or sheet bar), in particular a metal plate, is described. The temperature-control unit has one or plural temperature-control bodies, which are arrangeable in a furnace chamber of the furnace device. The temperature-control body has a plurality of receiving bores (in particular formed as through-borings). Furthermore, the temperature-control unit has a plurality of temperature-control pins, wherein the temperature-control pins are mounted in the receiving bores movably relative to the temperature-control body. The temperature-control pins are controllable in such a way that a temperature-control group of the temperature-control pins is extendable from the temperature-control body in the direction towards the plate so that a thermal contact between the temperature-control pins of the temperature-control group and a predetermined temperature-control zone of the plate is generatable.

According to a further aspect of the present invention, a method for operating a temperature-control unit for a furnace device for heat treating a plate (or blank, or sheet bar), in particular a metal board, is provided. According to the method, temperature-control pins are controlled in such a way that a temperature-control group of the temperature-control pins is extended from a temperature-control body in the direction towards the plate so that a thermal contact between the temperature-control pins of the temperature-control group and a predetermined temperature-control zone of the plate is generatable. The temperature-control body is arrangeable in a furnace chamber of the furnace device, wherein the temperature-control body has a plurality of receiving bores and the temperature-control pins are mounted in the receiving bores movably relative to the temperature-control body.

The plate (or blank, or sheet bar) may describe a metal workpiece and/or a semi-finished product, from which a component having a desired shape and ductility may be produced. For example, the plate may be a metal sheet having a thickness of less than approximately 2 cm, in particular less than approximately 1 cm. By the metal component, for example a metal device, such as a motor vehicle component, may be produced. For example, the motor vehicle component may represent an A- or B-pillar of a motor vehicle, a bumper bar or a door impact beam of a motor vehicle.

The furnace device may be configured for heating the plate. The plate may be heated or cooled in the furnace device to a desired temperature, e.g. to austenitization temperature. The austenitization temperature may amount for example from approximately 750° C. to approximately 1000° C., wherein the lower limit of the austenitization temperature may depend on the material of the metal component (steel and alloy fraction). Above the austenitization temperature, there may be a complete austenitic structure (or austenitic microstructure) in the metal component.

The temperature-control unit may provide a cooling of plates (i.e. for example a metallic piece goods, but also metallic ribbon) in a hot zone (up to 1000° C.) of the furnace chamber of a furnace device for achieving different hardness values in different areas of the plate. Herein, a transition range from a hard to a soft area may be variably adjusted, depending on the setting of the temperature-control group. The desired temperature-control zone of the plate may be specifically temperature-controlled, i.e. heated or cooled, by the temperature-control group of the temperature-control pins defined more specifically below.

Furthermore, the contact cooler and/or the temperature-control unit may be used in different gas atmospheres (air, dry air, protective gases) in the furnace chamber. The plate to be treated (piece goods or ribbon) may be coated with various metallic or metal oxide coatings (hot-dip aluminized, hot-dip galvanized, etc.).

The furnace device may have the furnace chamber or a plurality of different furnace chambers. For example, a specific temperature may be set in each furnace chamber so that the plate may be exposed to a specific temperature for heating or cooling in each one of the furnace chambers. In particular, the furnace device may be configured in such a way that a predetermined temperature profile that may be changeable over time can be set in the furnace chamber. The temperature profile may act on the plate while the latter may be in the furnace chamber of the furnace housing of the furnace device. For example, the furnace device may be configured in such a way that the plate may be stationary in the furnace housing during the entire temperature control process and may thus be located in one and the same furnace chamber. Alternatively, the furnace device may be configured, for example, in the form of a continuous furnace, so that the plate may, either sequentially or continuously, be conveyed by a conveying device through the furnace chamber or through plural furnace chambers that may be arranged one behind the other along the conveying direction.

A predetermined temperature profile that may be changeable in time (e.g. a heating up and/or a cooling down profile) may describe a spatial and/or temporal temperature profile of a temperature, which may be settable in a specific furnace chamber and which may act on the entire plate and/or on predetermined areas of the plate. For example, in the furnace device, the plate may be heated to a predetermined temperature in a first furnace chamber and at another time and/or in a further second furnace chamber a different temperature can be set, which may act on the plate and may cool or further heat the latter.

For this purpose, heating elements or cooling elements may be arranged in the furnace chamber so as to set a desired temperature profile in the furnace chamber such that the plate may be selectively heated, cooled or kept at the same temperature. For example, the temperature in a furnace chamber of the furnace device may be set between approximately 100° C. up to approximately 1000° C.

In order to selectively set different ductile areas of a plate, specific areas of the plate may be selectively heated differently in time and, in particular, cooled differently in time in order to thus set different (micro)structure areas in the different areas of the plate. In particular during a heating of the metal component, the heating rate may amount from approximately 1 K/s to approximately 20 K/s. By the temperature-control of the furnace chamber and in particular the temperature-control of the ribbon element described in detail further below, areas of the metal component may also be cooled, i.e. that cooling rates of approximately 1 K/s to approximately 40 K/s are achievable.

In the present invention, in particular, a predetermined temperature-control zone may be selectively temperature-controlled, i.e. heated or cooled, with a temperature-control group of temperature-control pins in order to set the desired (micro)structural areas in the temperature-control zone. Herein, in particular, predetermined temperature-control zones of the plate may be cooled slowly or rapidly, for example by bringing the temperature-control group of temperature-control pins into thermal contact with a predetermined surface area (temperature-control zone) of the plate, which may have to be cooled. Alternatively, in particular predetermined areas of the plate may be heated rapidly by bringing the temperature-control group of the temperature-control pins in thermal contact with a predetermined temperature-control zone of the plate, which may have to be heated rapidly.

In the following, the expression "thermal contact" may be understood to refer to a thermal interaction between two corresponding elements, e.g. the temperature-control pins on the one hand and the plate on the other hand, so that a rapid exchange of temperature between the corresponding two elements may be enabled. Such a rapid temperature exchange between the corresponding two elements (e.g. the temperature-control pins on the one hand and the plate on the other hand) may be achieved in particular in that the temperature-control pins of the temperature-control group may be present and/or are in physical contact with the temperature-control zone of the plate. This means, for example, that the temperature-control pins of the temperature-control group may touch the desired area (temperature-control zone) of the plate, so that thermal energy may be exchanged quickly. This may lead to a cooling or a heating of the temperature-control zone of the plate.

Alternatively, thermal contact may be understood to refer to that a small distance may be present between the temperature-control pins of the temperature-control group and the temperature-control zone of the plate, i.e. a distance of between approximately 1 millimeter and approximately 5 centimeters, in order to be able to set defined (micro) structures with corresponding different hardnesses.

In particular, the temperature-control body may have a high heat storage capacity, so that it may perform a temperature-controlling (heating or cooling) of the temperature-control pins. As described in detail further below in respect of various exemplary embodiments, the temperature control body may be arranged interchangeably in the furnace chamber and/or may be provided with a cooling or heating device (i.e. a temperature-control device). The temperature control body may, for example, be a hollow body, which may be filled with a cooling medium. The cooling medium may, for example, be a liquid or gaseous medium, such as for example water or other suitable liquids or gases. The walls of the temperature-control body may consist of a material having a high thermal conductivity, such as a metallic material.

The temperature-control body correspondingly may have a large number of receiving bores, into each of which, respectively, one of the temperature-control pins may be insertable. As a function of the temperature-control zone of the plate, i.e. the area to be temperature-controlled by the temperature-control pins, specific temperature-control pins may be combined to the temperature-control group and may be moved in the direction towards the plate. The temperature-control pins of the temperature-control group may thus be arranged so as to be movable between a first position and a second position in such a way that the temperature-control pins of the temperature-control group may be in the first position at a distance from the plate without thermal contact with the plate and may be in the second position in thermal contact with the plate. The temperature-control pins, which may not be part of the temperature-control group, may not be moved and may remain in the first position, i.e. at a distance from the plate. The temperature-control pins may rest directly on the surface of the plate. Elevations of the contour of the surface of the plate may move the corresponding temperature-control pins in the direction towards the temperature-control body and depressions in the contour of the surface of the plate may move the corresponding temperature-control pins away from the temperature-control body. Thus, even for an uneven implementation of the plate, the temperature-control pins may rest on the surface of the plate. Thus, even for uneven plates, a homogeneous temperature-controlling (heating or cooling) of the plate may be implemented. The temperature-control unit may form e.g. a contact cooler (so-called nail cooler). The temperature-control pins may form for example contact elements with the plate.

The temperature-control pins of the temperature-control group may be arranged displaceably in the respective receiving bores of the temperature-control body in such a way that the temperature-control pins in the second position may be placed on a surface of the plate and may be adapted to a contour of the surface of the plate. The temperature-control pins may be configured in such a way that they may compensate for unevennesses of the plates. When the plate cools down, it may warp. In one embodiment, the temperature-control pins may hang freely in the cooler and/or in the temperature-control body and may move freely in the direction towards the plate and may thereby compensate for unevennesses.

The temperature-control pins may consist, for example, of steel or a highly temperature-conductive material, such as magnesium, copper or aluminium. The temperature-control pins may have a diameter of approximately 4 to approximately 15 millimeters. The temperature-control pins may have, for example, a length of approximately 5 to approximately 50 centimetres, in particular of approximately 10 to approximately 20 centimetres.

The temperature-control body may consist, for example, also of steel, or a temperature-conductive material such as for example copper. In an exemplary embodiment, the temperature-control pins may have, for example, a diameter of approximately 4.8 millimeters. Correspondingly, the receiving bores may have a diameter of approximately 5 millimetres. For a better guidance or cooling effect and/or for a rapid re-cooling of the temperature-control pins, the temperature-control body may have a thickness of approximately 10 to approximately 50 centimeters.

According to the present invention, the temperature-control group may be flexibly extended and/or modified and adapted accordingly to different temperature-control zones of the plate. In this respect, the temperature-control pins may be controlled individually or group-wisely, in particular with the control mechanisms described in detail later. Thus, a temperature-control group may be defined as desired, which may cool specific temperature-control zones of the plate with a predetermined temperature curve (for example with a defined cooling rate), while the areas of the plate around the temperature-control zone may not be temperature-controlled by the temperature-control pins of the temperature-control group.

According to a further exemplary embodiment, the temperature-control body may have a temperature-control channel for a temperature-control fluid for temperature-controlling the temperature-control body. The temperature control body may, for example, be configured as a hollow profile and thus may form an internal cooling volume and/or the temperature control channel. The receiving bores may be arranged in predetermined rows and columns in the temperature-control body. The temperature control channel may run around the receiving bore. The temperature control channel and/or the temperature control volume in the temperature-control body may be filled with and emptied from the fluid via a fluid connection. The fluid for temperature-controlling may be in particular gaseous or liquid. For example, the medium may be a coolant and/or a cooling liquid for cooling the temperature-control body. Thus, a liquid cooling/heating of the temperature-control body may be implemented so that the temperature-control pins, which may be in thermal contact with the temperature control body, may be permanently temperature-controlled.

According to a further exemplary embodiment, the temperature control body may be manufactured by additive manufacturing. The additive manufacturing according to the present application may feature, for example, a three-dimensional printing, wherein the temperature-control body may be manufactured layer by layer. Herein, different variants of the three-dimensional printing may be used. In a first variant of the three-dimensional printing, a printable material may be introduced, for example, into a print head. Subsequently, the printable material may be melted in the print head. The print head may be a heatable extruder, in which the material may be fed. Within the extruder the material may be melted, such that the material may be transferred through the extruder (for example through an extruder nozzle) to a carrier layer, on which the melted material may have to be applied and/or inserted. The print head and the carrier layer may be moved relative to each other. After the introduced/applied layer of the temperature-control body has solidified (hardened), a further layer of the part of the temperature-control body may be subsequently formed by the print head.

The three-dimensional printing may also involve, in a further variant, an application of a printable material, in particular a powdery material onto a support surface, wherein the material may be subsequently solidified thermally, photosensitivity or by an adhesive. The adhesive may agglutinate the individual particles of the powdery material so that a corresponding layer is formed. The adhesive may be applied onto the powder layer by a print head. During the 3D printing with powder, the first (bottom) layer may be applied to the powder layer by a fluidic adhesive. The 3D printer may draw a 3D image on the first layer of the powder bed and may glue the material particles of the powder together. After this step, another thin layer of powder may be applied onto the first layer, and the 3D printing procedure may be repeated for creating a second layer. In this way, a 3D model of the temperature-control body may be created layer by layer by agglutinating layers of powder. In this case, the temperature-control body may grow from the bottom to the top. For this purpose, the powder bed may be lowered, e.g. by the height of a powder layer. The powder and the adhesive may consist of different materials.

Instead of using an adhesive, which may bond the material particles together, in another variant, the individual layers may be melted, namely using a thermal treatment device, such as a laser. This thermal treatment method may be called selective laser sintering (SLS) or selective laser melting (SLM). Due to the thermal treatment of the materials, metals, ceramics, or sand may be used. When SLS or SLM is used as a manufacturing method, the formation of the layer of the powder material may be performed by a laser, wherein the laser may melt or sinter the powder material in order to form at least one layer of the temperature-control body.

Further, the printable material for forming the temperature-control body may be melted by additive manufacturing by a controllable electron beam, which may be referred to as so-called electron beam melting (EBM). This manufacturing process may allow the use of materials with a higher melting point, such as for melting titanium materials.

For example, the printable material may be applied by a material feed nozzle. The printable material, e.g. powder, may be provided by the material feed nozzle, so that the printable material to be applied may be sprayed out of the material feed nozzle. By the material feed nozzle, a precise amount of material may be provided so that only the part of the component carrier to be printed may have to be covered with a (new) layer of printable material in order to form the temperature-control body. For example, the material feed nozzle for forming another layer of the temperature-control body may be movable. Depending on the movement of the material feed nozzle, the thickness and location of the layer to be formed may be adjusted. This step may be repeated until a final thickness of the layer is obtained. Thus, the temperature-control body may be formed layer by layer by spraying-on of printable material.

According to a variant, a layer of the temperature-control body may be placed in a material bed of e.g. liquid or powdery material. A layer of the temperature-control body may be solidified between the surface of the material bed and a substrate. The solidification or consolidation may be carried out by a treatment device, which may be configured for applying thermal energy to the surface of the material bed and/or for emitting a predefined wavelength of light for photopolymerization of the surface of the material bed. A liquid fluid material may be for example a photosensitive material, in particular a fluid material which may be photosensitivity curable under ultraviolet light of the laser. As a further manufacturing process, which may use fluid materials, so-called multi-jet modelling, poly-jet modelling may be applied. In this method, the fluid material may be solidified by a light source directly during application.

According to a further exemplary embodiment, the temperature-control body may have ferrules, which may be arranged in the receiving bores. The ferrules may, for example, be made of a highly temperature-conducting material. The temperature-control body may have, for example, perforated plates, wherein the holes may form the receiving bores. The ferrules may be inserted into these receiving bores and soldered to the heat exchanger and/or temperature-control body. For example, the receiving bores and/or ferrules may be plumbed and finally soldered in a vacuum furnace. The soldered joint may also be created by furnace soldering in protective gas or by direct soldering.

The temperature-control body may, for example, be manufactured integrally and in one piece. Alternatively, the temperature-control body may be manufactured from several modules which are then soldered together. The modules may, for example, be detachably coupled together or may be fixedly connected together, for example by welding or soldering.

According to a further exemplary embodiment, the temperature-control pins may have a cylindrical shape having a circular, elliptical or polygonal, especially quadrangular, base area. In particular, when the temperature-control pins are configured with a cylindrical shape having a quadrangular base, rows and columns of temperature-control pins in a very dense arrangement may be provided in corresponding receiving bores of the temperature-control body. In this way, a corresponding high resolution of temperature-control pins may be provided, which may be moved into the corresponding receiving bores of the temperature-control body. As a result, the temperature-control zone may be defined extremely precisely and varied (or in many different ways).

According to a further exemplary embodiment, at least two of the temperature-control pins may differ in respect of their diameter (and/or edge lengths).

According to another exemplary embodiment, at least two of the receiving bores may differ in respect of their diameter. In other words, temperature-control pins having different profile thicknesses may be used. Thus, for example, the receiving bores and the corresponding temperature-control pins may be larger in a center (or in a central area) than the receiving bores and the temperature-control pins, which may surround the center. If several pins and/or receiving bores arranged close to each other are located in a surrounding area around the centre, a temperature-control zone may be defined very precisely, especially in the edge area due to the high density of temperature-control pins, while larger temperature-control pins may be used in a centre, which may for example form a larger contact surface with the plate and corresponding good thermal contact with the plate.

With the defined geometries of the temperature-control group and the temperature-control pins, different temperature-control zones, i.e. cooled areas of the plate, having homogeneous or inhomogeneous and adjustable hardness ranges may be set by varying the nail sizes and/or the cooling capacity of the cooling body.

According to a further exemplary embodiment, the density (number of receiving bores per unit area) of receiving bores in a first area of the temperature-control body may differ from a density (number of receiving bores per unit area) of receiving bores in a second area of the temperature-control body. In other words, a first distance between two receiving bores in a first area of the temperature-control body may differ from a second distance between two receiving bores in a second area of the temperature-control body. Thus, also the number of temperature-control pins, which may be arranged in the receiving bores, may differ in different areas of the temperature-control body. By varying the hole distance between the receiving bores, the cooling capacity may be adjusted and may be different locally, e.g. from area to area. Thus, also flexibly rolled plates may be heat treated. The locally varying plate thicknesses may require different cooling capacities of the temperature-control pins. By adapting the cooling capacity to the sheet thickness of the plates by the number of temperature-control pins in different areas, it may nevertheless be possible to achieve the same (micro)structural properties in different sheet thickness areas.

According to a further exemplary embodiment, the temperature-control unit may have a control plate, to which the temperature-control pins may be coupled. The control plate may be arranged on a side of the temperature-control body facing away from the plate, wherein the control plate may be arranged movably relative the temperature-control body in such a way that the control plate may move the temperature-control pins (in particular exclusively the temperature-control pins of the temperature-control group) through the receiving bores of the temperature-control body.

For example, the temperature-control pins, and in particular the temperature-control pins of the temperature-control group, may be immovably fixed to the control plate so that the control plate, when moving in the direction towards the temperature-control body, may push the temperature-control pins through the receiving bores in the direction towards the plate or, when moving opposite to the direction towards the temperature-control body, may move the temperature-control pins away from the plate.

The control plate may, for example, be moved relative to the temperature-control body by a control motor which functions electrically, magnetically and/or electromagnetically or hydraulically.

According to a further exemplary embodiment, the control plate may have through-borings, in which the temperature-control pins may be displaceably mounted. The temperature-control pins each may have a pin head, which may have a larger diameter than the corresponding through-hole, in which the corresponding temperature-control pin may be inserted. The temperature-control pins may be inserted into the corresponding through-borings in such a way that a falling out of the pin heads in the direction towards the temperature-control body may be prevented. For example, the temperature-control unit may be aligned in such a way that the temperature-control pins may move towards the plate due to gravity until the pin head may rest on the control plate and a further movement of the temperature-control pin towards the plate may be stopped. If the temperature-control pin is subjected to a pressure force in the opposite direction to gravity, for example due to an elevation on the plate or due to a retaining mechanism and/or due to a lock of an associated receiving bore in the temperature-control body, the temperature-control pin may nevertheless move relative to the control plate in the opposite direction to gravity.

For example, certain receiving bores of the temperature-control body may be specifically closed, such that only the temperature-control pins of the temperature-control group may be guided through the non-closed receiving bores. In this case, for example, the control plate may move in the direction of gravity or in the direction towards the temperature control body so that the temperature-control pins of the temperature-control group may be moved through the temperature control body in the direction towards the plate, while the other temperature-control pins outside of the temperature-control group may rest on the temperature control body and may not be moved in the direction towards the plate.

According to a further exemplary embodiment, the control plate may be movable at a distance from the temperature-control body in such a way that an intermediate space may be formed between the control plate and the temperature-control body, in which intermediate space at least a part of the temperature-control pins may be present. A temperature-control fluid for temperature-controlling the part of the temperature-control pins may be introduced into the intermediate space. For example, a cooling fluid or a cooling gas may be introduced into this intermediate space in order to perform a temperature-control of the temperature-control pins.

According to a further exemplary embodiment, the temperature-control unit may have an insulating element for thermally insulating the temperature-control body from the plate. The insulating element may be arranged on the temperature-control body in such a way that an area of the temperature-control body, from which the temperature-control pins of the temperature-control group may be extendable from the temperature-control body towards the plate, may remain free from the insulating element. The insulating element thermally may insulate the temperature-control body from the plate in those areas, in which a thermal contact between the temperature-control body/temperature-control pins and the plate may be desired. The insulating element may be, for example, a temperature-resistant insulating plate or an insulating material consisting for example of mineral fibres. A combination of different insulating materials in the form of a layered structure may also be possible.

According to a further exemplary embodiment, the insulating element may be arranged at the temperature-control body in such a way that the insulating element may cover the receiving bores of the temperature-control body, in which temperature-control pins may be present, which may not belong to the temperature-control group of temperature-control pins, in order to block a movement of the corresponding temperature-control pins in the direction towards the plate. The insulating element may thus function according to the control templates described in the following.

According to a further exemplary embodiment, the temperature-control unit may have a control template, wherein the control template may have a predetermined pattern of through-borings for the temperature-control pins of the temperature-control group, wherein the pattern of through-borings may be indicative for the temperature-control zone of the plate (i.e. a projection of the pattern of through-borings on the plate may provide the temperature-control zone). The control template may be arranged at the temperature-control body with a predetermined orientation in such a way that, due to the pattern of through-borings, only the temperature-control pins of the temperature-control group may be passable through the through-borings of the control template and through the receiving bores of the temperature-control body in order to generate the thermal contact between the temperature-control pins of the temperature-control group and the temperature-control zone of the plate. Herein, the control template may also be configured as an insulation between the plate and the temperature-control body and may also be provided with through-borings.

According to a further exemplary embodiment, the control template may be exchangeably attachable to the temperature-control body. The control template may, for example, be attached to the temperature-control body in an exchangeable manner by a detachable connecting means, such as for example a screw connection or a clamp connection. In this way, different control templates having different patterns of through-borings may be attached so that different temperature-control zones of the plate may be temperature-controlled in a single manner and quickly.

According to a further exemplary embodiment, the temperature-control body may have two opposite guide rails, between which the control template may be insertable and fixable in the manner of a drawer.

According to a further exemplary embodiment, the temperature-control body may have an inner cavity into which the control template may be insertable and fixable. In particular, the guide strips may be arranged on a surface of the temperature-control body opposite to the plate, such that the control templates may be arranged between the temperature-control body and the control plate.

According to a further exemplary embodiment, the temperature-control unit further may have a control mechanism, which may be coupled to the temperature-control body in such a way that only the temperature-control pins of the temperature-control group may be extendable from the temperature-control body in the direction towards the plate. For example, a control element and/or control motor, which may drive the temperature-control pins pneumatically or electrically, may be associated to each temperature-control pin. In this way, via the control of the individual temperature-control pins, a desired temperature-control group may be formed, which may correspond to the temperature-control zone of the plate.

According to a further exemplary embodiment, the control mechanism may have a magnetic mechanism, which may be configured to generate a magnetic field that may be indicative for the shape of the temperature-control zone of the plate. The magnetic mechanism may be coupled to the temperature-control body in such a way that due to the magnetic field only the temperature-control group of the temperature-control pins may be extendable from the temperature-control body in the direction towards the plate. The magnetic mechanism may, for example, have plural electromagnets or permanent magnets that may be electrically switchable off, which magnets may be controlled individually in order to generate the magnetic field. Herein, the magnetic field may act repellent on the temperature-control pins of the temperature-control group, so that the temperature-control pins may be pressed in the direction towards the plate. Alternatively, the magnetic mechanism may be arranged in such a way that the plate may be located between the magnetic mechanism and the temperature-control body. The magnetic field accordingly may act attractingly on the temperature-control pins of the temperature-control group accordingly, and may pull the temperature-control pins of the temperature-control group from the temperature-control body in the direction towards the plate.

According to a further exemplary embodiment, the temperature-control body may be arrangeable in such a way that the temperature-control pins may be extendable in the direction towards the plate based on gravity. The magnetic field may be formed in such a way that a magnetic retention force may act on the temperature-control pins, which may not belong to the temperature-control group, so that only the temperature-control pins of the temperature-control group may be extendable. In other words, the magnetic field may act on the temperature-control pins, which may not belong to the temperature-control group, in such a way that the magnetic force may act from the plate in the direction towards the temperature-control body.

Thus, an automation of the desired cooling geometries/temperature-control zones of the plate (e.g. via a magnetic control of each individual nail and/or temperature-control pin or insertion of a different control template having the desired cooling geometry) may be possible.

According to a further exemplary embodiment, the temperature-control unit may have a plurality of return springs, which may be configured in such a way that one return spring may be associated to a temperature-control pin and may be coupled to it in such a way that the corresponding temperature-control pin may be fixable in a position remote from the plate by the return spring. In other words, compression or tension springs may be used, the spring force of which may act in a direction from the plate towards the temperature control body in order to hold the temperature-control pins away from the plate.

Alternatively, the return springs may also act in a direction, which may run from the temperature control body in the direction towards the plate. The return springs thus may act as drive springs and may push the temperature-control pins in the direction towards the plate. The control mechanism, e.g. the magnetic mechanism, thus may act against the return spring, so that for example the temperature-control pins, which may not belong to the temperature-control group, may be moved in the direction towards the temperature control body or may be held at the temperature control body.

According to a further exemplary embodiment, a control unit may be configured to obtain position data of the plate, wherein the control unit may further be configured to select the temperature-control pins of the temperature-control group based on the position data in order to generate the temperature-control zone of the plate based on a current position of the plate.

For example, via sensors, such as camera devices, distance sensors (e.g. ultrasonic sensors) and/or infrared sensors, the precise position of the component and/or of the plate in the furnace device may be determined. Based on this position data, the control unit may determine the current position of the desired temperature-control zone of the plate. On this basis, the control unit may determine the temperature-control pins, which may be to form the temperature-control group. On this basis, the control unit may control the control plate and/or the control mechanism in order to selectively move the temperature-control pins of the temperature-control group in the direction towards the plate and to keep the temperature-control pins, which may not belong to the temperature-control group, away from the plate.

For example, a lateral twisting or a moving of plates on the roller table (or roller conveyor) of a roller hearth furnace as a furnace device may occur. If due to this the plates do not move in the desired position under the temperature-control unit (also called Tailored Temperature-Control Unit), the offset or the rotation may be detected by the sensor either in the furnace or on the output roller table and automatically compensated for by the magnetic control of each temperature-control unit. Thus, no centering of the plates in the hot area may be necessary. Furthermore, the temperature-control body may be filled automatically with temperature-control pins.

According to a further aspect of the present invention, the temperature-control system may have at least two temperature-control units, which may be configured according to the temperature-control units described above. The at least two temperature-control units may be detachably attachable to each other. Thus, for example, plural temperature-control units may be detachably fixed to each other, for example by bolted connections. Accordingly, an arbitrary plurality of temperature-control units may be arranged according to the requirement profile of the plate and/or of the temperature-control zone of the plate. For example, if it is necessary to temperature-control a large temperature-control zone, plural temperature-control units having corresponding temperature control bodies and temperature-control pins may be coupled together. In this way, a modular temperature-control system may be established, which may be flexibly adapted to the necessary requirements of the temperature-control zone.

In this respect, the temperature-control unit may further have a fastening device, by which a temperature-control unit may be coupled detachably to a furnace housing, in particular to an upper basin area of the furnace housing in the interior of the furnace chamber. For example, the temperature-control unit may be suspended from the furnace housing and/or screwed to it. Thus, the possibility may exist that even already existing furnace devices may be retrofitted with the temperature-control unit according to the invention. In addition, the furnace device having the temperature-control unit may be adapted to different sizes of the temperature-control zone to be temperature-controlled. The control data for controlling the temperature-control unit may be transmitted, for example, wire-bound or wireless. Accordingly, the control unit may be arranged outside of the furnace housing, wherein for example the temperature-control body, the temperature-control pins and the control mechanism may be arranged in the interior of the furnace housing.

The installation or retrofitting of the temperature-control unit in existing systems or existing furnace zones, or by replacing the existing zones with new zones may be made possible with the modular temperature-control unit. The installation of a temperature-control unit may be provided via furnace caps (or furnace covers) or furnace plugs (or furnace stoppers) on the side of the furnace housing without an increase of the length of the system.

It is noted that the embodiments described herein may represent only a limited selection of possible embodiment variants of the invention. Thus, it may be possible to combine with each other the features of individual embodiments in a suitable manner, so that for the person skilled in the art, with the here explicit embodiments, a plurality of different embodiments are to be considered as obviously disclosed. In particular, some embodiments of the invention may be described with device claims and other embodiments of the invention may be described with process claims. However, it will immediately become clear to the person skilled in the art upon reading this application that, unless explicitly stated otherwise, in addition to a combination of features, which may belong to one type of subject-matter of the invention, an arbitrary combination of features, which may belong to different types of subject-matter of the invention, may also be possible.

BRIEF DESCRIPTION OF THE DRAWINGS

For a further explanation and a better understanding of the present invention, embodiment examples are described in the following in more detail with reference to the appended drawings, in which.

DETAILED DESCRIPTION OF EXEMPLARY EMBODIMENTS

Same or similar components in different figures are provided with the same reference numerals. The illustrations in the figures are schematic.

Figure 1:
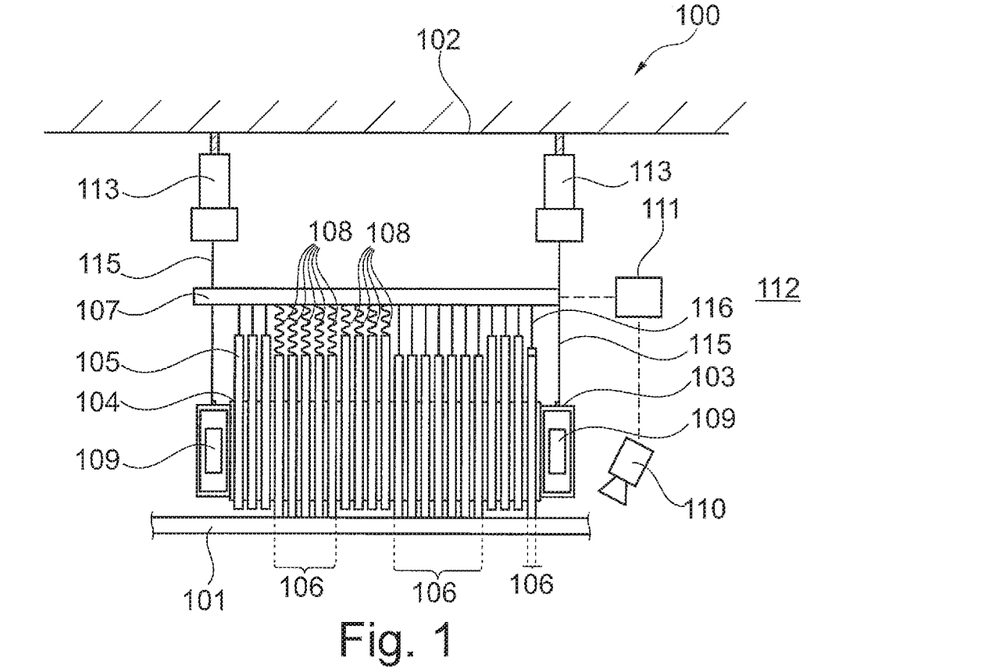
FIG. 1 is a schematic illustration of a temperature-control unit in a furnace device according to an exemplary embodiment of the present invention.

FIG. 1 shows a schematic illustration of a temperature-control unit in a furnace device 100 according to an exemplary embodiment of the present invention. The temperature-control unit may be configured for heat treating a plate 101, in particular a metal plate 101. The temperature-control unit may have a temperature-control body, which may be arrangeable in a furnace chamber 112 of the furnace device 100. The temperature-control body 103 may have a plurality of receiving bores 104. Furthermore, the temperature-control unit may have a plurality of temperature-control pins 105, wherein the temperature-control pins 105 may be mounted in the mounting bores 104 movably relative to the temperature-control body 103. The temperature-control pins 105 may be controllable in such a way that a temperature-control group 106 of the temperature-control pins 105 may be extendable from the temperature-control body 103 in the direction towards the plate 101, so that a thermal contact between the temperature-control group 106 of temperature-control pins 105 and a predetermined temperature-control zone of the plate 101 may be generatable.

The furnace device 100 may be configured for heating the plate 101. The plate 101 may be heated or cooled in the furnace device 100 to a desired temperature, e.g. to an austenitization temperature. The furnace device 100 may have the furnace chamber 112 or a plurality of different furnace chambers 112. For example, a specific temperature may be set in each furnace chamber 112 so that the plate 101 may be exposed to a specific temperature in each one of the furnace chambers 112 for heating or for cooling. In particular, the furnace device 100 may be configured in such a way that a predetermined temperature profile, which may be changeable in time, may be set in the furnace chamber 112. The temperature profile may act on the plate 101 while it may be located in the furnace chamber 112 of the furnace housing 102 of the furnace device 100. For example, heating or cooling elements may be arranged in the furnace chamber 112 in order to set a desired temperature profile in the furnace chamber 112 so that the plate 101 may be heated, cooled or kept at the same temperature in a targeted manner.

A predetermined temperature-control zone of the plate 101 may be selectively temperature-controlled, i.e. heated or cooled, by a temperature-control group 106 of temperature-control pins 105 in order to set the desired structure (or microstructure) areas in the temperature-control zone. In particular, predetermined temperature-control zones of the plate 101 may be cooled slowly or rapidly, for example by bringing the temperature-control group 106 of the temperature-control pins 105 in thermal contact with a predetermined surface area (temperature-control zone) of the plate 101, which area may have to be cooled or heated.

In FIG. 1, for a better overview, not all temperature-control pins 105 and receiving bores 104 have been provided with reference numerals.

The temperature-control body 103 accordingly may have a plurality of receiving bores 104, into each of which a respective one of the temperature-control pins 105 may be introducable. As a function of the temperature-control zone of the plate 101, i.e. the area, which may have to be temperature-controlled by the temperature-control pins 105, specific temperature-control pins 105 may be combined to form the temperature-control group 106 and may be moved in the direction towards the plate 101. The temperature-control pins 105 of the temperature-control group 106 may thus be arranged movably between a first position and a second position in such a way that the temperature-control pins 105 of the temperature-control group 106 may be present in the first position at a distance from the plate 101 without thermal contact with the plate 101, and may be present in the second position in thermal contact with the plate 101. The temperature-control pins 105, which may not belong to temperature-control group 106, may not be moved and may remain in the first position, i.e. at a distance from the plate 101. The temperature-control pins 105 may rest directly on the surface of the plate 101. Elevations of the contour of the surface of the plate 101 may move the corresponding temperature-control pins 105 in the direction towards the temperature-control body 103, and depressions in the contour of the surface of the plate 101 may move the corresponding temperature-control pins 105 away from the temperature-control body 103. In this way, even for an uneven implementation of the plate 101, the temperature-control pins 105 may rest on the surface of the plate 100.

The temperature-control pins 105 of the temperature-control group 106 may be arranged displaceably in the respective receiving bores 104 of the temperature-control body 103 in such a way that the temperature-control pins 105 may be placeable in the second position on a surface of the plate 101 and may be adaptable to a contour of the surface of the plate 101.

The temperature-control group 106 may be flexibly extended and/or changed and accordingly adapted to different temperature-control zones of the plate 101. In this respect, the temperature-control pins 105 may be controlled individually or group-wisely.

The temperature-control body 103 may have a temperature control channel 109 for a temperature control fluid for temperature-controlling the temperature-control body 103. Thus, the temperature-control body 103 may be temperature-controlled to a desired temperature. The temperature-control body 103 may be in thermal contact with the temperature-control pins 105 so that the latter may be set to a desired temperature by the temperature-control body 103.

The temperature-control body 103 may be attached to the furnace housing 102, for example, via an attachment device 113. A control mechanism 107, a control plate 401 (see FIG. 4) and the temperature-control body 103 may be mounted to the attachment device 113, e.g. via suspensions 115.

The temperature-control unit may further be detachably coupled to the furnace housing 102 by the attachment device 113, in particular to an upper basin area of the furnace housing 102 in the interior of the furnace chamber 112. For example, the temperature-control unit may be suspended from the furnace housing 102 and/or may be screwed to the latter.

The temperature-control unit may further have the control mechanism 107, which may be coupled to the temperature-control body 103 in such a way that only the temperature-control pins 105 of the temperature-control group 106 may be extendable from the temperature-control body 103 in the direction towards the plate 101. For example, to each temperature-control pin 105 may be assigned a control mechanism 116 or control motor, which may drive the temperature-control pin 105 pneumatically, electromagnetically or electrically. In this way, a desired temperature-control group 106, which may correspond to the temperature-control zone of the plate 101, may be formed via the control of the individual temperature-control pins 105.

The control mechanism 107 may have, for example, a magnetic mechanism, which may be configured to generate a magnetic field, which may correspond indicatively to the shape of the temperature-control zone of the plate 101. The magnetic mechanism may be coupled to the temperature-control body 103 in such a way that, due to the magnetic field, only the temperature-control group 106 of the temperature-control pins 105 may be extendable from the temperature-control body 103 in the direction towards the plate 101.

The temperature-control body 103 may be arranged in such a way that the temperature-control pins 105 may be extendable in the direction towards the plate 101 based on the force of gravity. The magnetic field may be configured in such a way that a magnetic retention force may act on the temperature-control pins 105, which may not belong to the temperature-control group 106, so that only the temperature-control pins 105 of the temperature-control group 106 may be extendable.

The temperature-control unit may further have a plurality of return springs 108, which may be configured in such a way that a return spring 108 may be associated to a temperature-control pin 105 and may be coupled to the latter in such a way that the corresponding temperature-control pin 105 may be fixable in a position remote from the plate 101 by the return spring 108. In other words, compression or tension springs may be used, the spring force of which may act in a direction from the plate 101 towards the temperature control element 103 in order to hold the temperature-control pins 105 away from the plate 101. For the sake of clearness, a corresponding return spring 108 is only drawn on a part of the temperature-control pins 105. In particular, all temperature-control pins 105 may be equipped with a corresponding return spring 108.

Furthermore, a control unit 111 may be provided which may be configured to receive position data from the plate 101. The control unit 111 may select the temperature-control pins 105 of the temperature-control group 106 based on the position data in order to generate the temperature-control zone of the plate 101 based on a current position of the plate 101.

For example, the precise position of the plate 101 in the furnace fixture 100 may be determined via sensors 110, such as camera equipment, distance sensors (for example ultrasonic sensors) and/or infrared sensors.

Based on these position data, the control unit 111 may determine the current position of the desired temperature-control zone of the plate 101. Based on this data, the control unit 111 may determine the temperature-control pins 105, which may have to form the temperature-control group 106. On this basis, the control unit may control the control plate 401 (see FIG. 4) and/or the control mechanism 107 in order to selectively move the temperature-control pins 105 of the temperature-control group 106 in the direction towards the plate and to keep the temperature-control pins 105, which may not belong to the temperature-control group 106, away from the plate 101.

Figure 2:
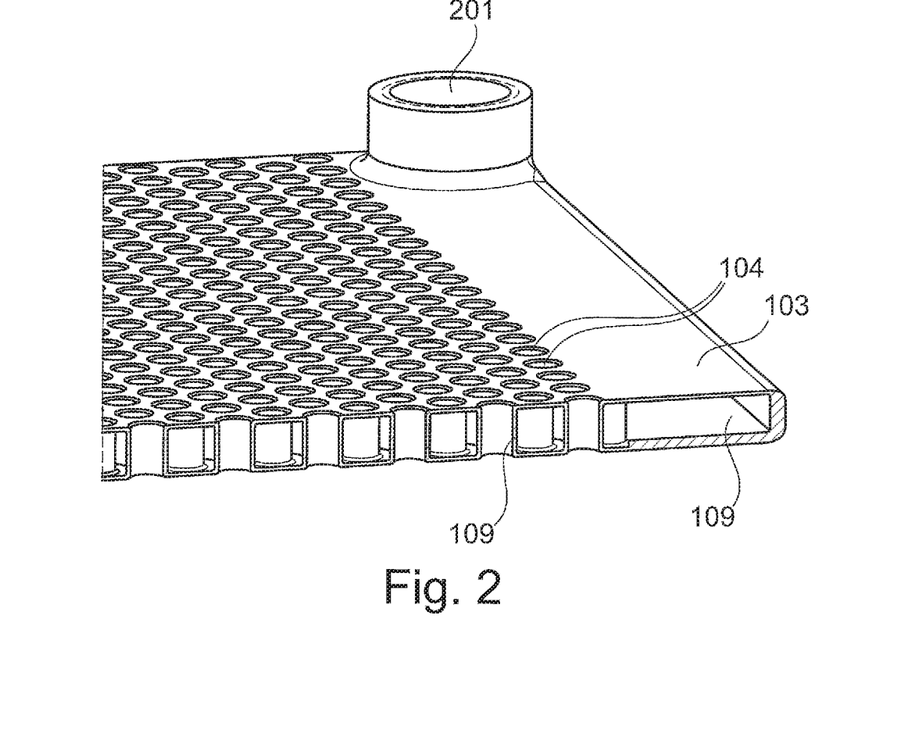
FIG. 2 is a schematic sectional view of a temperature-control body according to an exemplary embodiment of the present invention.

FIG. 2 shows a schematic sectional view of the temperature-control unit 103.

Figure 3:
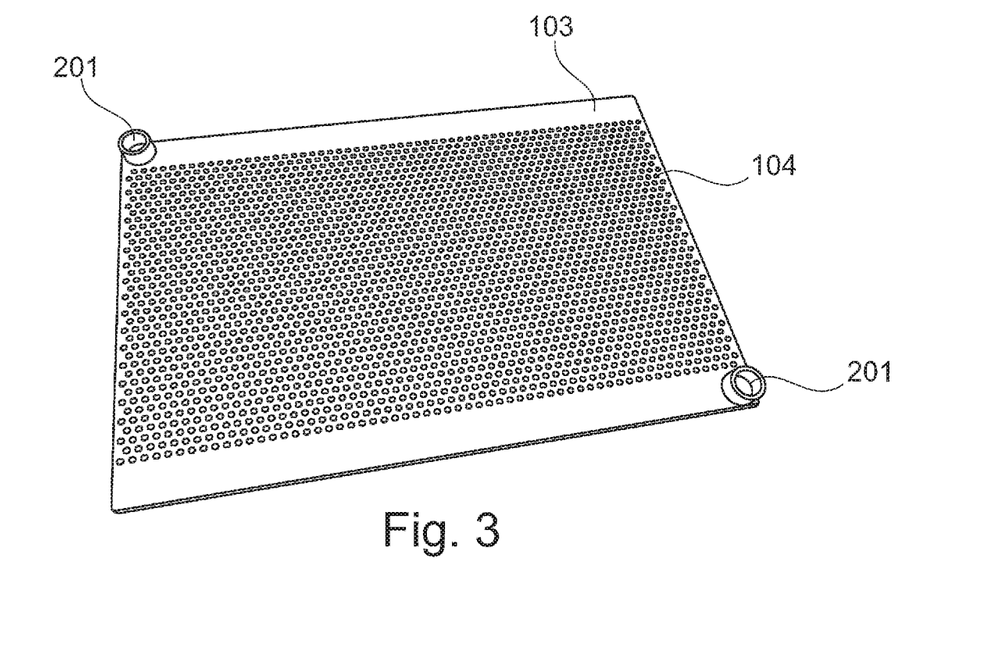
FIG. 3 is a schematic illustration of a temperature-control body according to an exemplary embodiment of the present invention.

FIG. 3 shows a perspective view of the temperature control body 103 from FIG. 2. The temperature control body 103 may have in particular a high heat storage capacity, so that it may perform a temperature-controlling (heating or cooling) of the temperature-control pins 105. The temperature-control body 103 may be arranged interchangeably (or replaceably) in the furnace chamber 112 and/or may be equipped with a cooling or heating device (i.e. a temperature-control body). As shown in FIG. 2, the temperature control body 103 may be a hollow body, which may be filled with a cooling medium or a heating medium. The hollow profile may thus form an internal temperature-control volume and/or the temperature-control channel 109.

The receiving bores 104 may be arranged in predetermined rows and columns in the temperature-control body 103. The temperature control channel 109 may run around the receiving bore 104. The temperature-control channel and/or the temperature-control volume in the temperature-control body 103 may be filled with and emptied from fluid via a fluid connection 201. A liquid cooling/heating of the temperature control body 103 may be implemented so that the temperature-control pins 105, which may be in thermal contact with the temperature control body 103, may be permanently temperature-controlled.

As shown in FIG. 2, the temperature-control body 103 may have a complex hollow profile, in which each receiving bore 104 may be surrounded by the temperature control channel 109 so that a temperature control medium may flow around the receiving bores 104. According to the invention, a correspondingly highly complex hollow profile of the temperature-control body 103 may be provided, in particular by an additive manufacturing process.

Figure 4:
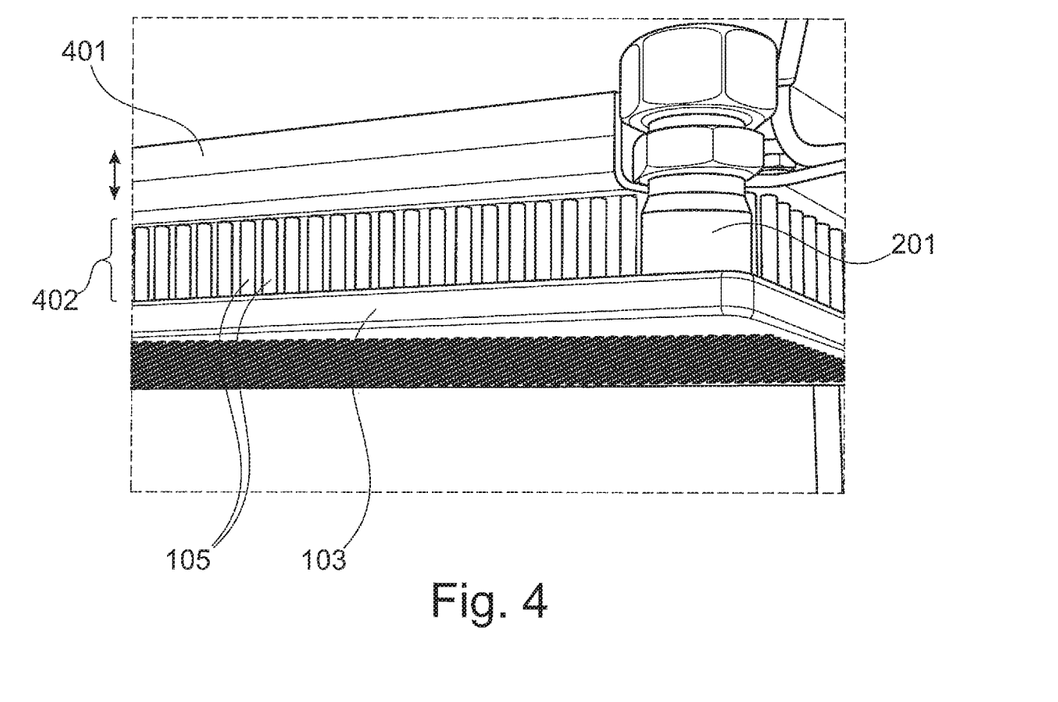
FIG. 4 and FIG. 5 are schematic illustrations of a temperature-control unit having a control plate in a furnace device according to an exemplary embodiment of the present invention.
Figure 5:
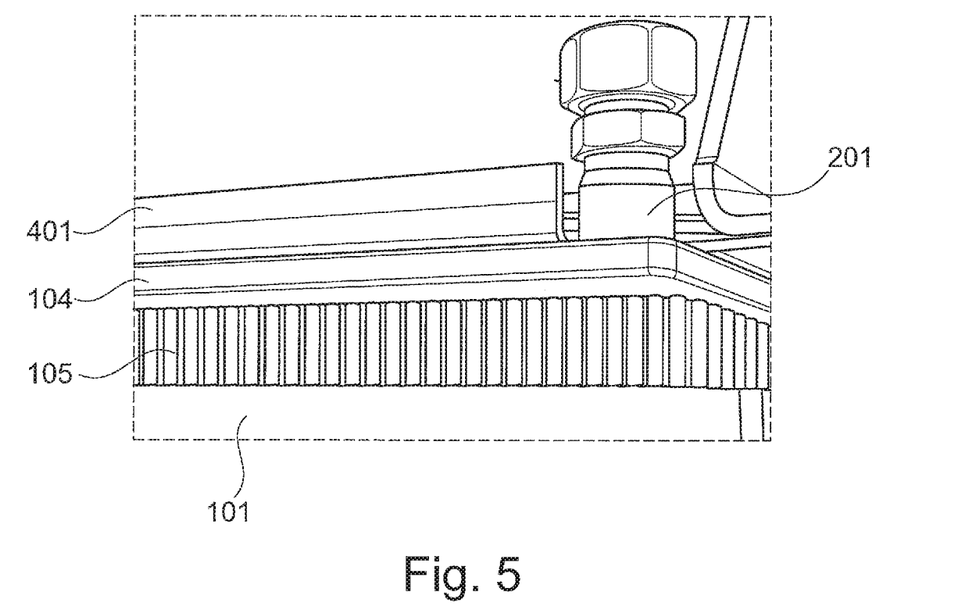

FIG. 4 and FIG. 5 show schematic illustrations of a temperature-control unit having a control plate 401 in a furnace device 100 according to an exemplary embodiment of the present invention.

The temperature-control pins 105 may be coupled to the control plate 401. The control plate 401 may be arranged on a side of the temperature-control unit 103 facing away from the plate 101. The control plate 401 may be arranged movably relative to the temperature-control body 103 in such a way that the control plate 401 may move the temperature-control pins 105 (in particular exclusively the temperature-control pins 105 of the temperature-control group 106) through the receiving bores 104 of the temperature-control body 103.

The temperature-control pins 105 may be fixed to the control plate 401 so that the control plate 401, when moving in the direction towards the temperature-control body 103, may push the temperature-control pins 105 through the receiving bores 104 in the direction towards the plate 101 or, when moving opposite to the direction towards the temperature-control body 103, may move the temperature-control pins 105 away from the plate 101.

The control plate 401 may have through-borings in which the temperature-control pins 105 may be slidably mounted. The temperature-control pins 105 each may have a pin head, which may have a larger diameter than the corresponding through-hole, in which the corresponding temperature-control pin 105 may be inserted. The temperature-control pins 105 may be inserted in the corresponding through-borings in such a way that a falling out in the direction towards the temperature control body 103 may be blocked by the pin heads. The temperature-control unit may be aligned in such a way that the temperature-control pins 105 may move in the direction towards the plate 101 due to gravity until the pin head may rest on the control plate 401 and further movement of the temperature-control pin 105 in the direction towards the plate 101 may be stopped. If the temperature-control pin 105 experiences a pressure force opposite to the direction towards gravity, for example due to an elevation on the plate 101 or due to a retaining mechanism (e.g. the return springs 108) and/or due to a locking of an associated receiving bore 104 in the temperature-control body 103, the temperature-control pin 105 may nevertheless move opposite to the direction towards gravity relative to the control plate 401.

For example, specific receiving bores 104 of the temperature-control body 103 may selectively be closed so that only the temperature-control pins 105 of the temperature-control group 106 may pass through the unclosed receiving bores 104. In this case, for example, the control plate 401 may move in the direction towards gravity and/or in the direction towards the temperature-control body 103 so that the temperature-control pins 105 of the temperature-control group 106 may be moved through the temperature-control body 103 in the direction towards the plate 101, while the other temperature-control pins 105 outside of the temperature-control group 106 may rest on the temperature-control body 103 and may not be moved in the direction towards the plate 101. The closing of the receiving bores 104 may be provided for example by a control template. The control template may have a predetermined pattern of through-borings for the temperature-control pins 105 of the temperature-control group 106, wherein the pattern of through-borings may be indicative for the temperature-control zone of the plate 101.

Furthermore, the control plate 401 may be movable at a distance from the temperature-control body 103 in such a way that an intermediate space 402 may be formed between the control plate 401 and the temperature-control body 103, in which intermediate space at least some of the temperature-control pins 105 may be present. A temperature-control fluid for temperature-controlling the part of the temperature-control pins 105 may be introduced into the intermediate space 402.

Figure 6:
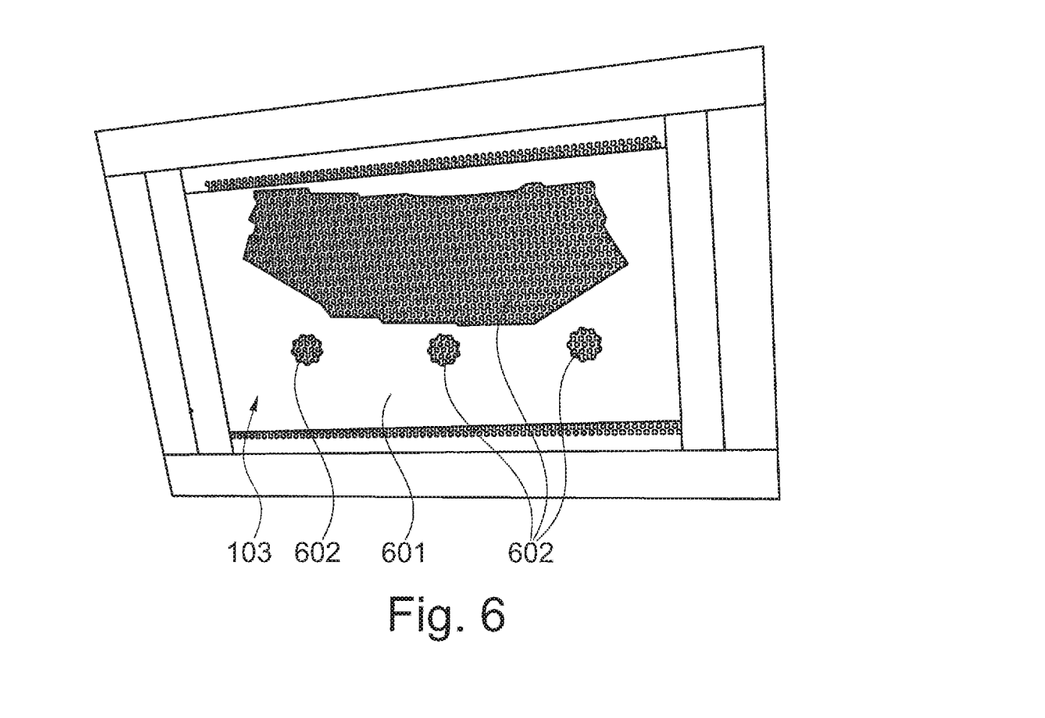
FIG. 6 is a schematic illustration of a temperature-control body having an insulating element according to an exemplary embodiment of the present invention.

FIG. 6 shows a schematic illustration of a temperature-control body 103 having an insulating element 601 according to an exemplary embodiment of the present invention. The insulating element 601 may be arranged on the temperature-control body in such a way that an area of the temperature-control body 103, from which the temperature-control pins 105 of the temperature-control group 106 can or should be extendable from the temperature-control body 103 in the direction towards the plate 101, may remain free from the insulating element 601. The insulating element 601 may thermally insulate the temperature-control body from the plate 101 in those areas, in which a thermal contact between the temperature-control body 103/temperature-control pins 105 and the plate 101 (and/or temperature-control zone) may be desired.

The insulating element 601 may be arranged at the temperature-control body 103 in such a way that the insulating element 601 may cover the receiving bores 104 of the temperature-control body 103, in which temperature-control pins 105 may be present, which may not belong to the temperature-control group 106 of the temperature-control pins 105, in order to block a movement of the corresponding temperature-control pins 105 in the direction towards the plate. The insulating element 601 may thus act according to a control template.

The insulating element 601 as a control template may have a predetermined pattern of through-borings for the temperature-control pins 105 of the temperature-control group 106, wherein the pattern of through-borings may be indicative for the temperature-control zone of the plate 101 (i.e. a projection of the pattern of through-borings on the plate may provide the temperature-control zone). The control template may be arranged at the temperature-control body 103 with a predetermined orientation.

Supplementarily, it should be noted that "having" does not exclude other elements or steps, and "an" or "a" does not exclude a plurality. Furthermore, it should be noted that features or steps, which are described with reference to one of the above embodiment examples, may also be used in combination with other features or steps of other embodiment examples described above. Reference numerals in the claims should not be considered as a limitation.

LIST OF REFERENCE NUMERALS 100 furnace device
101 metal plate
102 furnace housing
103 temperature-control unit
104 receiving bore
105 temperature-control pin
106 temperature-control group
107 control mechanism
108 return spring
109 temperature-control channel
110 sensor
111 control unit
112 furnace chamber
113 attachment device
114 suspension
115 control element
201 fluid connection
401 control plate
402 intermediate space
601 insulating element
602 uncovered receiving bores

The invention claimed is:

1. Temperature-control unit for a furnace device for heat treating a plate, comprising:
   a temperature-control body, which is arrangeable in a furnace chamber of the furnace device,
   wherein the temperature-control body has a plurality of receiving bores, and
   a plurality of temperature-control pins,
   wherein the temperature-control pins are mounted in the receiving bores movably relative to the temperature-control body,
   wherein the temperature-control pins are controllable in such a way that a temperature-control group of the temperature-control pins is extendable from the temperature-control body in a direction towards the plate, so that a thermal contact is establishable between the temperature-control group of temperature-control pins with a predetermined temperature-control zone of the plate.

2. Temperature-control unit according to claim 1, wherein the temperature-control body has a temperature-control channel for a temperature-control fluid for temperature-controlling the temperature-control body.

3. Temperature-control unit according to claim 1, wherein the temperature-control body is manufactured by additive manufacturing.

4. Temperature-control unit according to claim 1, wherein the temperature-control body has ferrules, which are arranged in the receiving bores.

5. Temperature-control unit according to claim 1, wherein the temperature-control pins have a cylindrical shape with a circular, elliptical or polygonal base surface.

6. Temperature-control unit according to claim 1, wherein at least two of the temperature-control pins differ in their diameter.

7. Temperature-control unit according to claim 1, wherein at least two of the receiving bores differ in their diameter.

8. Temperature-control unit according to claim 1, wherein the density of receiving bores in a first region of the temperature-control body differs from a density of receiving bores in a second region of the temperature-control body.

9. Temperature-control unit according to claim 1, further having:
a control plate to which the temperature-control pins are coupled,
wherein the control plate is arranged on a side of the temperature-control body facing away from the plate,
wherein the control plate is arranged movably relative to the temperature-control body in such a way that the control plate moves the temperature-control pins through the receiving bores of the temperature-control body.

10. Temperature-control unit according to claim 1, further having:
an insulating element for thermally insulating the temperature-control body from the plate,
wherein the insulating element is arranged at the temperature-control body in such a way that a region of the temperature-control body, from which the temperature-control pins of the temperature-control group are extendable out of the temperature-control body in the direction towards the plate, remains free from the insulating element or in that the temperature-control pins move through borings through the insulating material.

11. Temperature-control unit according to claim 10, wherein the insulating element is arranged at the temperature-control body in such a way that the insulating element covers the receiving bores of the temperature-control body, corresponding to temperature-control pins present, which do not belong to the temperature-control group of the temperature-control pins, in order to block a movement of the corresponding temperature-control pins in the direction towards the plate.

12. Temperature-control unit according to claim 1, further having:
a control template,
wherein the control template has a predetermined pattern of through-borings for the temperature-control pins of the temperature-control group,
wherein the pattern of through-borings is indicative for the temperature-control zone of the plate,
wherein the control template is arranged at the temperature-control body with a predetermined orientation in such a way that, due to the pattern of through-borings, only the temperature-control pins of the temperature-control group are passable through the through-borings of the control template as well as through the receiving bores of the temperature-control body in order to generate the thermal contact between the temperature-control pins of the temperature-control group and the temperature-control zone of the plate.

13. Temperature-control unit according to claim 11, wherein the temperature-control body has an inner cavity, into which the control template is insertable and fixable.

14. Temperature-control unit according to claim 1, further having:
a control mechanism, which is coupled to the temperature-control body in such a way that only the temperature-control pins of the temperature-control group are extendable from the temperature-control body in the direction towards the plate.

15. Temperature-control unit according to claim 14,
wherein the control mechanism has a magnetic mechanism, which is configured to generate a magnetic field that is indicative for a shape of the temperature-control zone of the plate,
wherein the magnetic mechanism is coupled to the temperature-control body in such a way that, due to the magnetic field, only the temperature-control group of the temperature-control pins is extendable from the temperature-control body in the direction towards the plate.

16. Temperature-control unit according to claim 5, wherein the temperature-control body is arrangeable in such a way that the temperature-control pins are extendable in the direction towards the plate based on gravity,
wherein the magnetic field is formed in such a way that a magnetic retaining force is not applicable to the temperature-control pins which do not belong to the temperature-control group, so that only the temperature-control pins of the temperature-control group are extendable.

17. Temperature-control unit according to claim 14, further having a plurality of return springs, which are configured in such a manner that a return spring is associated with a temperature-control pin and is coupled to the latter in such a way that the associated temperature-control pin is fixable in a position remote from the plate by the return spring.

18. Temperature-control unit according to claim 14, further having:
a control unit,
wherein the control unit is configured to receive position data of the plate, and
wherein the control unit is further configured to select the temperature-control pins of the temperature-control group based on the position data in order to generate the temperature-control zone of the plate based on a current position of the plate.

19. A temperature-control system for temperature-controlling a temperature-control zone of a plate, wherein the temperature-control system comprises:
at least two temperature-control units according to claim 1, and
wherein the at least two temperature-control units are detachably fixable together.

* * * * *